C. FOBES.
Coffee Pot.
No. 67,185.
Patented July 30, 1867.
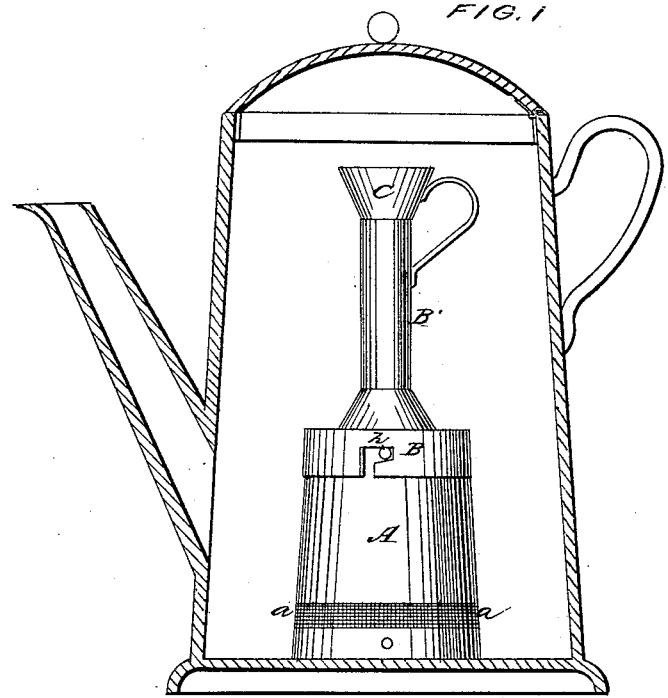
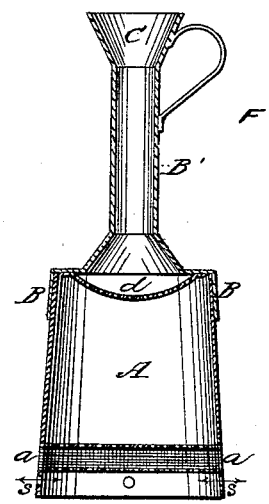
WITNESSES:
R. T. Campbell
Edw. Schaler
INVENTOR:
Charles Fobes
by his attys
Mason Fenwick Lawrence

United States Patent Office.

CHARLES FOBES, OF WHITEWATER, WISCONSIN.

Letters Patent No. 67,185, dated July 30, 1867.

---

COFFEE-GENERATOR.

---

*The Schedule referred to in these Letters Patent and making part of the same.*

---

TO ALL WHOM IT MAY CONCERN:

Be it known that I, CHARLES FOBES, of Whitewater, in the county of Walworth, and State of Wisconsin, have invented a new and improved Coffee-Generator; and I do hereby declare that the following is a full, clear, and exact description thereof, reference being had to the accompanying drawings, making a part of this specification, in which—

Figure 1 is a side view of my improved generator applied within a coffee-pot, which is indicated in section in red lines.

Figure 2 is a diametrical section through the generator, showing more particularly its construction.

Similar letters of reference indicate corresponding parts in the two figures.

This invention relates to a new and useful device which is adapted for use in a common coffee-pot or boiler of any kind in the process of extracting the aroma of coffee without having the grounds mixed with the liquid.

The invention consists in a vessel having perforated sides and bottom and a movable cover, to which latter a tube is applied, terminating at its upper end in a funnel opening, and at its lower end in a strainer, whereby ground coffee can be subjected to the steeping process in any suitable vessel to the best advantage, without having the grounds mixed with the liquid, as will be hereinafter described.

To enable others skilled in the art to understand my invention, I will describe its construction and operation.

In the accompanying drawings, A represents a vessel, which may be made of any suitable shape and capacity, and which has its sides and bottom finely perforated, as shown at $a$, figs. 1 and 2. The perforated bottom of this vessel is raised, as shown in fig. 2, so as to leave a space below it for the free circulation of the liquid through the vessel A during the steeping process. The sides of the vessel which project below the perforated bottom form the supporting flange, which is also perforated as at $s\ s$, to allow of the inflow and outflow of the water during said operation. The top of this vessel is provided with a cover, B, which is constructed with a central tube, B', terminating at its upper end in a funnel, $c$, and at its lower end in a strainer, $d$, which latter is below the top of the cover, as shown in fig. 2. The cover B should either be fitted very tightly upon the vessel A, or it should be provided with the "bayonet" catch $h$, or some other suitable fastening.

The manner of using the generator is as follows: Ground coffee is put into the vessel A, and the cover B put upon it and fastened in its place; the vessel is then put into a common coffee-pot containing a proper quantity of hot water, and the coffee allowed to steep a sufficient length of time, after which a quantity of the fluid is poured from the coffee-pot into any suitable vessel, and from this into the vessel A through the tube B', this vessel A remaining in the coffee-pot all the time during the process. When the liquid which has thus been poured into the vessel A settles to a level with that which is in the pot, this vessel A is then removed, and the coffee is ready for use.

A common coffee-pot will be found most convenient for receiving the generator, as it is sufficiently high to allow of the covers being shut during the process of steeping, though coffee can be made with my generator in any vessel containing hot water. The hydraulic pressure produced by pouring the fluid through the tube B' forces the fluid which was in the vessel A through the fine strainer $d$ around the side and bottom of this vessel, so that the fluid poured into it at the top of the tube must flow down through the whole mass of ground coffee before it finds an outlet, thereby leaching it and imbibing its strength in the most thorough manner. The strainer $d$ at the bottom of the tube B' is used for the purpose of preventing any coffee-grounds or other substance in the vessel A from rising and flowing over at the top of the tube while the fluid is being poured in. As nothing can escape through the generator but the clear liquid, nothing is required to "clear or settle" the coffee.

Having thus described my invention, what I claim as new, and desire to secure by Letters Patent, is—

I claim as a new article of manufacture, a coffee-generator constructed as described.

CHAS. FOBES.

Witnesses:
J. D. ROBINSON,
J. D. SWEETLAND.